(12) United States Patent
Hein et al.

(10) Patent No.: US 9,279,477 B2
(45) Date of Patent: Mar. 8, 2016

(54) MOTION CONTROL DEVICE

(75) Inventors: Dave Hein, Oakdale, MN (US); Anthony Kilber, Andover, MN (US)

(73) Assignee: Nexen Group, Inc., Vadnais Heights, MN (US)

( * ) Notice: Subject to any disclaimer, the term of this patent is extended or adjusted under 35 U.S.C. 154(b) by 12 days.

(21) Appl. No.: 13/978,587

(22) PCT Filed: Jan. 6, 2012

(86) PCT No.: PCT/US2012/020439
§ 371 (c)(1),
(2), (4) Date: Jul. 8, 2013

(87) PCT Pub. No.: WO2012/094570
PCT Pub. Date: Jul. 12, 2012

(65) Prior Publication Data
US 2014/0083221 A1    Mar. 27, 2014

Related U.S. Application Data

(60) Provisional application No. 61/430,663, filed on Jan. 7, 2011.

(51) Int. Cl.
*F16H 1/06* (2006.01)
*B66C 23/84* (2006.01)
(Continued)

(52) U.S. Cl.
CPC *F16H 1/06* (2013.01); *B66C 23/84* (2013.01); *F16H 55/12* (2013.01); *F16H 57/023* (2013.01); *F16C 19/06* (2013.01); *Y10T 74/19679* (2015.01); *Y10T 74/19684* (2015.01)

(58) Field of Classification Search
CPC ........... F16H 1/06; F16H 55/12; F16H 55/10; F16H 2057/0056; F16H 19/06; Y10T 74/19679; Y10T 74/19684; B66C 23/84
USPC .............. 74/89.17, 89.18, 813 R, 406, 412 R, 74/413–416, 421 R, 421 A, 422; 384/449, 384/456, 461, 499, 501, 502; 105/29.1
See application file for complete search history.

(56) References Cited

U.S. PATENT DOCUMENTS 2,488,825 A * 11/1949 Palumbo .................... 384/453
3,144,278 A *  8/1964 Pohler et al. ............... 384/493
(Continued)

FOREIGN PATENT DOCUMENTS

EP    2 169 261 A2    3/2010
FR       2372347 A1    6/1978
(Continued)

*Primary Examiner* — William Kelleher
*Assistant Examiner* — Bobby Rushing, Jr.
(74) *Attorney, Agent, or Firm* — Alan D. Kamrath; Kamrath IP Lawfirm, P.A.

(57) ABSTRACT

Motion control apparatus (A) includes a direct coupled torque motor (54) slideably receiving an output (50) without other types of torque transmission devices between the output (50) and the motor (54) and between the output (50) and a pinion (7) in direct gearing engagement with an annular gear (44) connected to a second race (32) of a bearing (26) intermediate an annular mounting plate (38) and a dial plate (40). The second race (32) is a single, non-separable piece having L-shaped cross sections to define a mounting pilot for the annular gear (44). The motor (54) is secured to a mount plate (58) having an integral annular spacer (60) extending through a mounting tab (16) and secured to a mount ring (62) adjustably connected to the mounting tab (16) opposite to the mount plate (58).

20 Claims, 3 Drawing Sheets

(51) Int. Cl.
*F16H 55/12* (2006.01)
*F16H 57/023* (2012.01)
*F16C 19/06* (2006.01)

(56) References Cited

U.S. PATENT DOCUMENTS

| | | | |
|---|---|---|---|
| 3,888,357 A * | 6/1975 | Bauer et al. | 212/175 |
| 3,937,540 A | 2/1976 | Morizur | |
| 4,307,621 A * | 12/1981 | Merron | 74/421 A |
| 4,463,995 A * | 8/1984 | Andree | 384/620 |
| 4,622,860 A | 11/1986 | Cametti et al. | |
| 5,667,455 A * | 9/1997 | Suzuki et al. | 475/331 |
| 5,820,270 A * | 10/1998 | Richardson | 384/275 |
| 5,944,429 A * | 8/1999 | Berry | 384/506 |
| 6,023,989 A * | 2/2000 | Imase et al. | 74/422 |
| 6,044,723 A | 4/2000 | Eda et al. | |
| 6,761,660 B2 | 7/2004 | Lim | |
| 7,413,092 B2 * | 8/2008 | Hanamoto | E02F 9/121 212/181 |
| 2003/0066370 A1 * | 4/2003 | Russ et al. | 74/414 |
| 2007/0116394 A1 * | 5/2007 | Hart | 384/513 |
| 2009/0016665 A1 * | 1/2009 | Yoshida et al. | 384/613 |
| 2012/0090415 A1 | 4/2012 | Lim | |
| 2012/0174690 A1 | 7/2012 | Lim | |
| 2012/0243819 A1 * | 9/2012 | Errard et al. | 384/608 |

FOREIGN PATENT DOCUMENTS

| | | |
|---|---|---|
| KR | 100460083 B1 | 11/2004 |
| KR | 20060095266 A | 8/2006 |
| WO | WO2012/057410 A1 | 5/2012 |

* cited by examiner

MOTION CONTROL DEVICE

BACKGROUND

Motion control apparatus, particularly apparatus providing precise positioning between two elements, and specifically to apparatus providing precise rotational positioning between two elements is shown and described.

Precise positioning between two elements is required in many applications including, but not limited to, the medical, semi-conductor manufacturing, satellite tracking and welding fields. Conventionally, precise positioning was accomplished utilizing cam based drive systems. Such cam based drive systems had several shortcomings including being complicated, having backlash, having large power requirements, and the like and are costly to manufacture, operate and maintain. Thus, solutions are being sought for providing precise positioning and overcoming the shortcomings of conventional cam based drive systems.

U.S. Pat. No. 6,023,989 provides a transmission device which has enjoyed commercial success. What is needed is the application of a transmission device, such as in the form shown in U.S. Pat. No. 6,023,989, in a manner producing synergistic results in the field of precise positioning between elements.

SUMMARY

This need and other problems in the field of motion control is solved by providing a bearing between an annular mounting plate and a dial plate and an annular gear connected to the second race of the bearing. The second race of the bearing has L-shaped cross sections including a first radially extending leg and a second axially extending leg integrally extending as a single, non-separable piece from the first leg to define a mounting pilot for the annular gear.

In another aspect, the output of a motor, such as of a direct coupled torque type, is connected to a pinion without other types of torque transmission devices between the output and the motor and between the output and the pinion, with the pinion in direct gearing engagement with the annular gear connected to the second race of the bearing connected intermediate the annular mounting plate and the dial plate.

In further aspects, the motor is secured to an annular mount plate of a motor mount also having an integral annular spacer extending through a through passage of a mounting tab extending radially from the mounting plate. A mount ring abuts with and is secured to the annular spacer and abuts with and is adjustably connected to the mounting tab at different radial positions opposite to the mount plate. The output of the motor extends through the annular spacer and the annular mount plate.

Illustrative embodiments will become clearer in light of the following detailed description in connection with the drawings.

DESCRIPTION OF THE DRAWINGS

The illustrative embodiments may best be described by reference to the accompanying drawings where.

Figure 1:
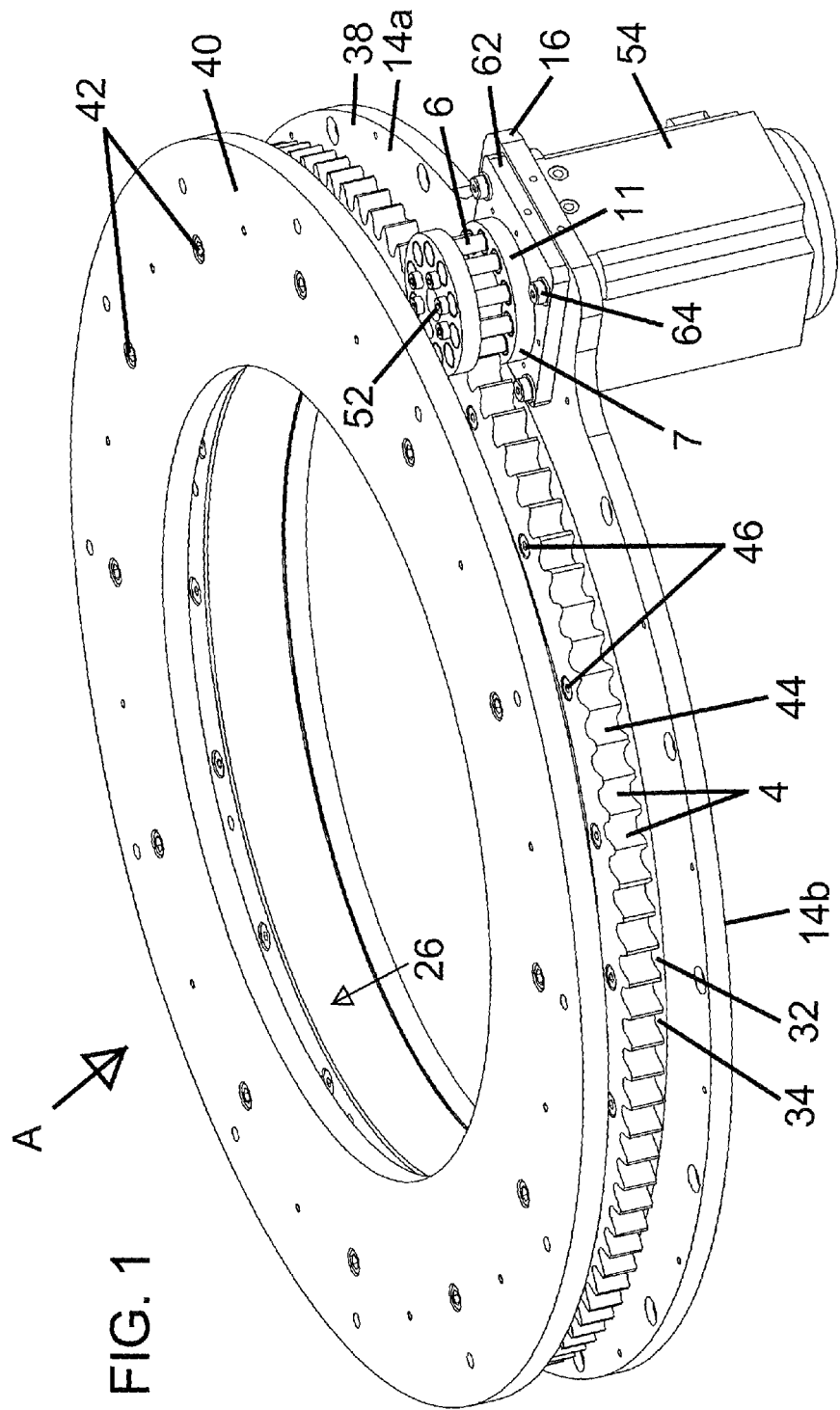
FIG. 1 shows a perspective view of a form of a motion control apparatus.
Figure 2:
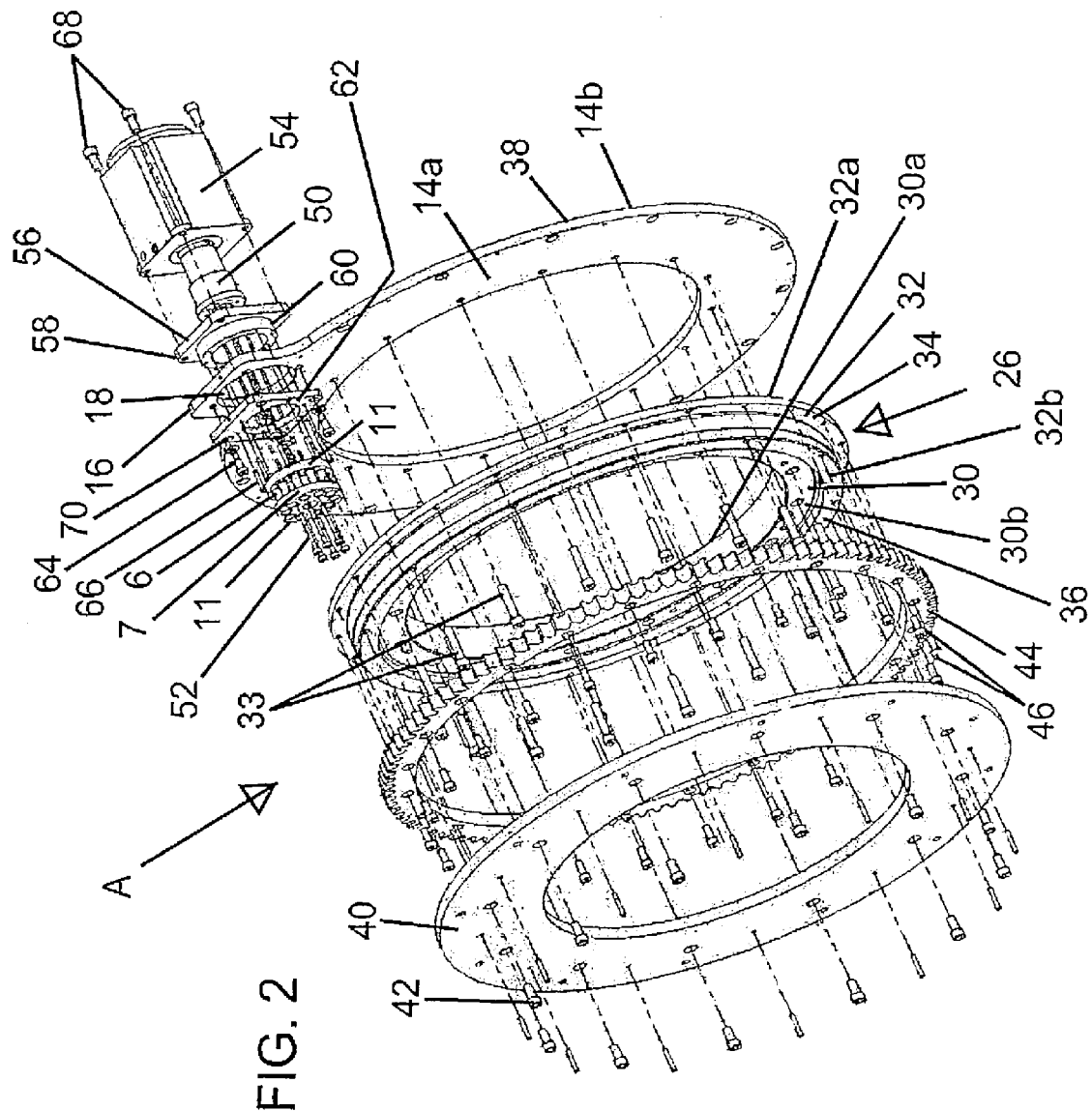
FIG. 2 shows an exploded perspective view of the apparatus of FIG. 1.
Figure 3:
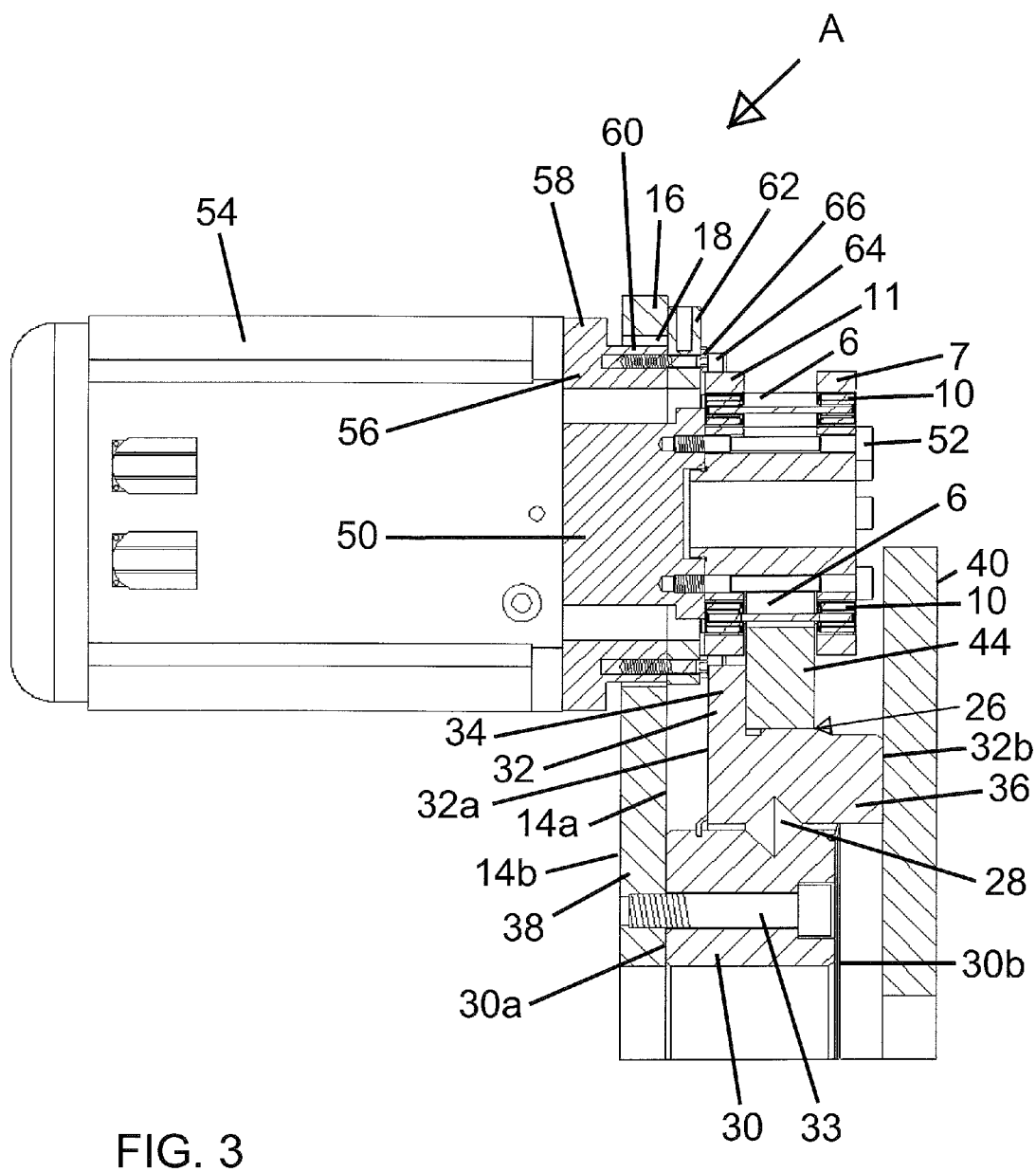
FIG. 3 shows a partial, cross sectional view of the apparatus of FIG. 1.

All figures are drawn for ease of explanation of the basic teachings only; the extensions of the figures with respect to number, position, relationship, and dimensions of the parts to form the illustrative embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "forward", "rearward", "reverse", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION OF THE ILLUSTRATIVE EMBODIMENTS

A motion control apparatus A is shown providing precise positioning and, particularly, providing precise rotational positioning between two elements. Particularly, in the form shown, apparatus A generally includes a mounting plate 38 having parallel, spaced, planar faces 14a and 14b. In the form shown, plate 38 is annular in shape and is generally circular in shape. Plate 38 includes a mounting tab 16 extending radially outwardly from the outer circumference of the circular shape and including a through passage 18 extending generally between faces 14a and 14b.

Apparatus A further includes a bearing 26 including rotational elements 28 located between inner and outer races 30 and 32. Inner race 30 has first and second, parallel, spaced, planar ends 30a and 30b, and in the form shown is annular in shape. First end 30a abuts with face 14a, with inner race 30 secured to mounting plate 38 such as by bolts 33 extending through inner race 30 from end 30b to end 30a and threadably received in mounting plate 38. In the form shown, the heads of bolts 33 are countersunk in end 30b. In the form shown, inner race 30 has rectangular cross sections parallel to a rotational axis.

Outer race 32 has first and second, parallel, spaced, planar endings or ends 32a and 32b and, in the form shown, is annular in shape. First end 32a is located axially intermediate and axially spaced from ends 30a and 30b of inner race 30, with rotational elements 28 located intermediate end 32a of outer race 32 and end 30b of inner race 30. The races 30 and 32 are axially maintained relative to each other by suitable provisions such as by the shape of the rotating elements 28 in the form shown. A dial plate 40 abuts with end 32b, with outer race 32 secured to dial plate 40 such as by bolts 42 extending through dial plate 40 and threadably received in outer race 32. Dial plate 40 in the form shown is annular in shape, is generally circular in shape, and has parallel, spaced, planar faces.

In the form shown, outer race 32 has L-shaped cross sections parallel to the rotational axis and including a first, radially extending leg 34 including end 32a and a second, axially extending leg 36 including end 32b and integrally extending as a single, non-separable piece from leg 34 to define a mounting pilot for an annular gear 44. Gear 44 is secured to outer race 32 such as by bolts 46 extending through gear 44 and threadably received in leg 34. Gear 44 is intermediate mounting plate 38 and dial plate 40.

A pinion 7 of the type of U.S. Pat. No. 6,023,989, which is incorporated herein by reference, includes rollers 6 circumferentially arranged to be supported by a pair of annular plates 11. Each of the rollers 6 of pinion 7 are rotationally supported between the pair of annular plates 11 by bearings 10 received in sockets in the pair of annular plates 11. Rollers 6 are positioned in parallel with each other at regular intervals in the circumferential direction and between the pair of annular plates 11 and are adapted to mesh concurrently with corresponding teeth 4 of gear 44.

Pinion 7 is suitably connected to an output 50, in the form shown as being a stub shaft, such as by bolts 52 extending through annular plates 11 and threaded into output 50 and located radially inward of rollers 6 in a non-interfering position with teeth 4 of gear 44. Output 50 extends through passage 18 and is directly rotated by a direct coupled torque motor 54 into which output 50 is slideably received. It should be appreciated that there are no gears, gearboxes, or other types of torque transmission devices between output 50 and motor 54 and between output 50 and pinion 7.

Suitable provisions are provided for mounting motor 54 to mounting plate 38. In the form shown, a motor mount 56 includes an annular plate 58 suitably secured to motor 54 such as by bolts 68 extending through motor flanges and threadably received in plate 58. Mount 56 includes an annular spacer 60 integrally extending axially from annular plate 58 and of a size for passing through passage 18 and for passage of output 50 therethrough. A mount ring 62 abuts with face 14*a* of mounting plate 38 and is suitably secured thereto such as by bolts 64 extending through mount ring 62 and threadably secured to mounting tab 16. Mount ring 62 abuts with the end face of annular spacer 60 and is suitably secured thereto such as by bolts 66 extending through mount ring 62 and threadably secured to motor mount 56. Suitable provisions are provided for providing adjustment of the radial spacing of axes of gear 44 and output 50 such as providing elongated slots 70 in mount ring 62 through which fasteners such as bolts 64 connected to mounting tab 16 extend.

Now that an illustrative form of apparatus A has been set forth, some of the advantages and synergistic results obtained thereby can be highlighted. For purposes of explanation, it will be assumed it is desired to rotate 100 kilogram square meter inertia for 90 degrees in 1 second. In a dynamic equation for this move requires acceleration at 6.2845 radians per second signal for 0.5 seconds (rotating 45 degrees), then deceleration at the same rate for 0.5 seconds (rotating another 45 degrees). This is commonly known as a triangular motion profile, having a maximum velocity of 30 rpm. The torque required to do this move is governed by the equation $r=i*\alpha$, so that the required torque is 628.3 Nm at the output during acceleration and deceleration.

Conventional drive systems utilized servo motors with a high precision planetary gearbox. As servo motors are most efficient at 3000 RPM, the best fit gear ratio for the system would be $$\frac{3000 \text{ rpm}}{30 \text{ rpm}} = 100:1$$

Using the required torque and gear ratio, the maximum acceleration torque can be determined as $$\frac{628.3 \text{ Nm}}{100} = 6.28 \text{ Nm}(MotorTorque)$$

The best high precision planetary gearboxes are 95% efficient and typically have 1 arcmin accuracy. Appling this to the system yields the following results:
Required motor torque . . . 6.59 Nm
System backlash . . . 1 arcmin
Average Power . . . 1035 Watts Conversely, if motion control apparatus A has the same dynamic requirements, it will react as explained. With pinion 7 and gear 44 having a 10 to 1 gear ratio, the maximum acceleration torque for apparatus A would be $$\frac{628.3 \text{ Nm}}{10} = 62.8 \text{ Nm,}$$

but with motor 54 running at 300 RPM max. Applying that and the 99% efficiency of pinion 7 and gear 44, apparatus A would yield the following results:
Required motor torque . . . 63.46 Nm
System backlash . . . 0 arcmin
Average Power . . . 996.82 Watts The previous example proves gains in backlash, required torque and efficiency by utilizing torque motor 54 and pinion 7 and gear 44 combinations. Those gains alone are a substantial improvement over traditional drive systems. Furthermore, direct drive torque motor 54 provides many more advantages including:

1. Simplicity—By removing the gearbox, there is one less part in the assembly.

2. Durability—Gearboxes have traditionally been a weak point in the drive system. By removing the gearbox, there is one less failure point.

3. Speed—Direct coupled torque motors 54 have the fastest response time of any system. Adding a gearbox slows that response time due to the windup of internal components.

4. Precision—Direct drive torque motors 54 have a substantially higher precision than that of a mechanical system.

In the form shown, gear 44 is directly mounted upon the mounting pilot of outer race 32 without utilizing a transition plate, which functions have been incorporated into bearing 26. Thus, the cost and expense of a transition plate is eliminated. Furthermore, to fasten a bearing to a transition plate, clearance needs to be created for the head of the screw. This clearance is created by adding a step to the conventional mounting plate. Although this is a simple feature in the conventional mounting plate, it is extremely costly to manufacture, because there is a large amount of material removal required. Also, a large milled relief is required to properly position a gearbox relative to the pinion and gear. These two features make the conventional mounting plate one of the most expensive components of conventional systems.

It should be appreciated that bearing 26 as shown allows mounting plate 38 to be manufactured out of a single flat plate which dramatically reduces the overall cost and complexity of mounting plate 38 and, thus, apparatus A when compared to stepped, specially formed mounting plates which are conventionally utilized. By engineering features into bearing 26 and rearranging other components, any special features have been removed from mounting plate 38, creating a much simplified, less costly design. Specifically, by incorporating an offset between the inner and outer races 30 and 32 of the bearing 26, a costly step in the mounting plate 38 has been eliminated. Also, a precisely positioned mounting pilot in outer race 32 of bearing 26 for the gear 44 to be mounted was created. This allows the stackup of the pinion, spacer and preloader plate to be such that the mounting surface of mounting plate 38 does not require a milled alignment feature. Adding features to bearing 26 does add cost to that component. However, as machining operations are already being done to bearing 26, the cost added is not as significant as the savings realized by eliminating all machined features from the mounting plate 38 except drilled holes.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Motion control apparatus comprising, in combination: a mounting plate having an annular shape and having first and second, parallel, axially spaced planar faces; a bearing including rotational elements located between first and second races, with the first race connected to the first face of the mounting plate; a dial plate, with the second race connected to the dial plate; and an annular gear separately formed from the second race, with the annular gear connected to the second race intermediate the mounting plate and the dial plate, with the first race being annular in shape having a first end and a second end spaced from the first end, with the first end being planar and abutting with the first planar face of the mounting plate, with the second race being annular in shape having first and second, spaced, endings, with the second race including a first, radially extending leg including the first ending and a second axially extending leg including the second ending and integrally extending from the first leg as a single, non-separable piece in operation, with the first leg extending radially outwardly from the second leg, with the first leg having a radial extent greater than the second leg, and with the second leg having an axial extent greater than the first leg with the first and second legs defining a mounting pilot for the annular gear located radially outwardly of the second leg.

2. The motion control apparatus of claim 1, wherein the annular shape is generally circular in shape, wherein the second end of the first race is planar, with the first and second endings being planar and spaced and parallel to each other, with the first race having rectangular cross sections, with the mounting plate secured by bolts extending through the first race from the second end to the first end and threadably received in the mounting plate, with the first leg including a planar surface intermediate, parallel to and spaced from the first and second endings, with the second leg including an annular surface extending generally between the planar surface and the second ending and generally perpendicular to the planar surface, with the rotational elements located intermediate the first ending of the second race and the second end of the first race, with the dial plate being annular in shape and having parallel, spaced, planar faces.

3. The motion control apparatus of claim 1 further comprising, in combination: a pinion in direct gearing engagement with the annular gear.

4. The motion control apparatus of claim 3 further comprising, in combination: a motor including an output, with the pinion connected to the output without other types of torque transmission devices between the output and the motor and between the output and the pinion.

5. The motion control apparatus of claim 4, wherein the mounting plate includes a mounting tab extending radially outwardly from the annular shape and including a through passage extending between the first and second planar faces, with the motor connected to the second planar face, with the output extending through the through passage.

6. The motion control apparatus of claim 4, wherein the pinion includes a pair of annular plates and a plurality of rollers rotationally positioned in parallel with each other at regular intervals in a circumferential direction and between the pair of annular plates, with the plurality of rollers meshing concurrently with corresponding teeth of the annular gear.

7. The motion control apparatus of claim 6, wherein each of the pair of annular plates includes a plurality of sockets at the regular intervals, with a roller support bearing received in each of the sockets and rotationally supporting one of the plurality of rollers.

8. The motion control apparatus of claim 6 further comprising, in combination: bolts extending through the pair of annular plates and threaded into the output, with the bolts located radially inward of the plurality of rollers in a non-interfering position with the annular gear, with the bolts connecting the pinion to the output.

9. The motion control apparatus of claim 4, wherein the motor is a direct coupled torque motor, wherein the output is slideably received in the direct coupled torque motor, with the output being in the form of a stub shaft.

10. Motion control apparatus comprising, in combination: a mounting plate having an annular shape and having first and second, parallel, axially spaced planar faces, wherein the mounting plate includes a mounting tab extending radially outwardly from the annular shape and including a through passage extending between the first and second planar faces; a bearing including rotational elements located between first and second races, with the first race connected to the first face of the mounting plate; a dial plate, with the second race connected to the dial plate; an annular gear formed separately from the second race, with the annular gear connected to the second race intermediate the mounting plate and the dial plate; a pinion in direct gearing arrangement with the annular gear; and a motor including an output, with the motor connected to the second face, with the output extending through the through passage, and with the pinion connected to the output.

11. The motion control apparatus of claim 10, wherein the pinion is connected to the output without other types of torque transmission devices between the output and the motor and between the output and the pinion.

12. The motion control apparatus of claim 11, wherein the motor is a direct coupled torque motor, wherein the output is slideably received in the direct coupled torque motor, with the output being in the form of a stub shaft.

13. The motion control apparatus of claim 10 further comprising, in combination: a motor mount including an annular mount plate secured to the motor and an annular spacer integrally extending from the annular mount plate, with the annular spacer extending through the through passage, with the output extending through the annular spacer and the annular mount plate, with the annular mount plate abutting with the second face of the mounting plate; and a mount ring abutting with and secured to the annular spacer, with the mount ring abutting with the first face of the mounting plate, with the mount ring being adjustably connected to the mounting tab at different radial positions.

14. The motion control apparatus of claim 13, wherein the mount ring includes elongated slots; and wherein the motion control apparatus further comprises fasteners extending through the elongated slots and connected to the mounting tab to adjustably connect the mount ring to the mounting tab at the different radial positions.

15. The motion control apparatus of claim 11, wherein the pinion includes a pair of annular plates and a plurality of rollers rotationally positioned in parallel with each other at regular intervals in a circumferential direction and between the pair of annular plates, with the plurality of rollers meshing concurrently with corresponding teeth of the annular gear.

16. The motion control apparatus of claim 15, wherein each of the pair of annular plates includes a plurality of sockets at the regular intervals, with a roller support bearing received in each of the sockets and rotationally supporting one of the plurality of rollers.

17. The motion control apparatus of claim 15 further comprising, in combination: bolts extending through the pair of annular plates and threaded into the output, with the bolts located radially inward of the plurality of rollers in a non-interfering position with the annular gear, with the bolts connecting the pinion to the output.

18. A motion control apparatus comprising, in combination: a mounting plate having an annular shape and having first and second, parallel, axially spaced planar faces, wherein the mounting plate includes a mounting tab extending radially outwardly from the annular shape and including a through passage extending between the first and second planar faces; a bearing including rotational elements located between first and second races, with the first race connected to the first face of the mounting plate; a dial plate, with the second race connected to the dial plate; an annular gear connected to the second race intermediate the mounting plate and the dial plate; a motor including an output; a pinion connected to the output and in gearing engagement with the annular gear, with the motor connected to the second planar face, with the output extending through the through passage; a motor mount including an annular mount plate secured to the motor and an annular spacer integrally extending from the annular mount plate, with the annular spacer extending through the through passage, with the output extending through the annular spacer and the annular mount plate, with the annular mount plate abutting with the second face of the mounting plate; and a mount ring abutting with and secured to the annular spacer, with the mount ring abutting with the first face of the mounting plate, with the mount ring being adjustably connected to the mounting tab at different radial positions.

19. The motion control apparatus of claim 18, wherein the mount ring includes elongated slots; and wherein the motion control apparatus further comprises fasteners extending through the elongated slots and connected to the mounting tab to adjustably connect the mount ring to the mounting tab at the different radial positions.

20. The motion control apparatus of claim 19, wherein the pinion includes a pair of annular plates and a plurality of rollers rotationally positioned in parallel with each other at regular intervals in a circumferential direction and between the pair of annular plates, with the plurality of rollers meshing concurrently with corresponding teeth of the annular gear.

* * * * *

UNITED STATES PATENT AND TRADEMARK OFFICE
CERTIFICATE OF CORRECTION

PATENT NO. : 9,279,477 B2
APPLICATION NO. : 13/978587
DATED : March 8, 2016
INVENTOR(S) : Dave Hein and Anthony Kilber Page 1 of 1

It is certified that error appears in the above-identified patent and that said Letters Patent is hereby corrected as shown below:

In the Specification
Column 3, line 52, delete "r=i*α" and substitute therefore -- $\tau = i * \alpha$ --.

Signed and Sealed this
Twenty-first Day of June, 2016

Michelle K. Lee
*Director of the United States Patent and Trademark Office*